Nov. 4, 1924.
F. H. STANWOOD
1,514,181
UNIVERSAL JOINT
Filed April 30, 1921  2 Sheets-Sheet 1
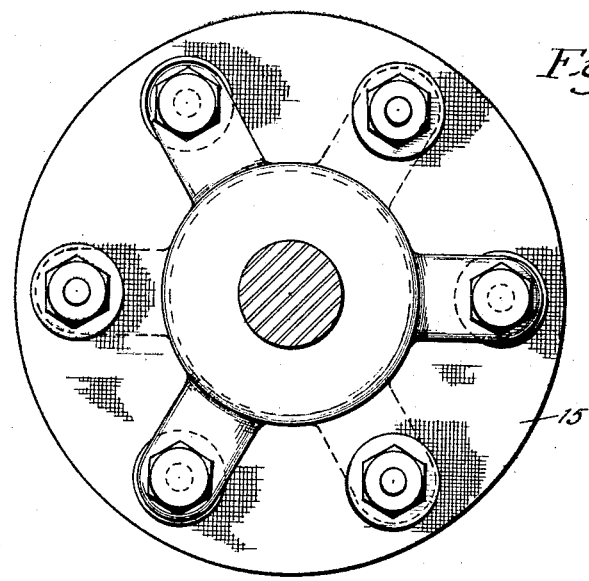
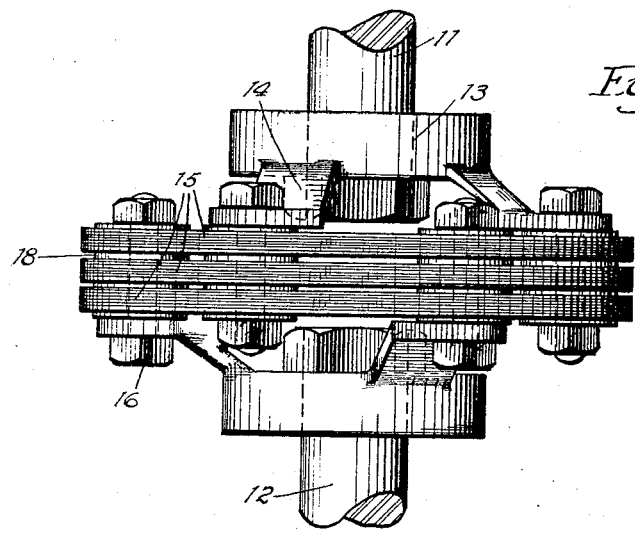
INVENTOR
Frank H. Stanwood
BY Munday, Clarke
& Carpenter
ATTORNEY Nov. 4, 1924.  
F. H. STANWOOD  
UNIVERSAL JOINT  
Filed April 30 1921  
1,514,181  
2 Sheets-Sheet 2

INVENTOR  
Frank H. Stanwood  
BY Munday, Clarke  
& Carpenter  
ATTORNEY

Patented Nov. 4, 1924.

1,514,181

UNITED STATES PATENT OFFICE.

FRANK H. STANWOOD, OF WILMETTE, ILLINOIS, ASSIGNOR TO STANWOOD EQUIPMENT COMPANY, OF CHICAGO, ILLINOIS, A CORPORATION OF MAINE.

UNIVERSAL JOINT.

Application filed April 30, 1921. Serial No. 465,815.

*To all whom it may concern:*

Be it known that I, FRANK H. STANWOOD, a citizen of the United States, residing in Wilmette, in the county of Cook and State of Illinois, have invented a new and useful Improvement in Universal Joints, of which the following is a specification.

This invention relates in general to universal joints and has more particular reference to universal joints of the character employed in automobile transmissions and the like, although it will be manifest as it is better understood that it has valuable use in other connections, particularly where the angularity of the connected shafts is relatively slight.

The invention contemplates the provision of a flexible annulus or disk to which the adjacent ends of the shafts to be connected may be secured at intervals about the periphery, the disk itself transmitting the power and its flexing permitting the angularity. I am aware that effort has been made in the past to provide this construction by superimposing layers of woven cloth, one upon the other, and embedding said layers in a rubber body. Thus constructed the threads of the woven material extend in straight lines within the fabric and the stretching of the materials under suddenly applied loads tends to fracture them.

My present invention contemplates, as a principal object, the provision within the plies, of threads, yarn or string so arranged as to properly transmit the power from the one shaft to the other without danger of breaking the individual threads or fibres from the sudden application of power.

My invention has for a principal object also the provision of a structure of this character wherein the threads of each ply will be one continuous thread member and without more than two free ends, whereby distribution of strain is insured as contradistinguished from a tendency to pull the fibre body away from the threads in the stretching.

Numerous other objects and advantages of the invention will be apparent as it is better understood from the following description, which, taken in connection with the accompanying drawings, discloses a preferred embodiment thereof.

Referring to the drawings,

Figure 1 is a side elevation of an automobile universal joint embodying my invention;

Fig. 2 is a side elevation thereof;

Figure 3:
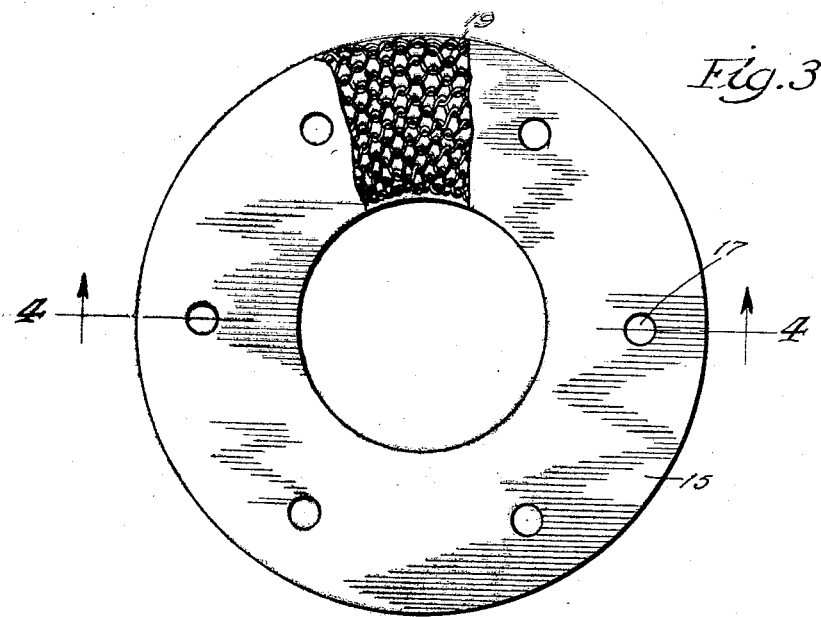
Fig. 3 is a side elevation of a coupling or connecting disk or annulus, parts being broken away to show the knitted construction.

For the purpose of illustrating my invention I have shown on the drawing two shafts 11 and 12 to be connected and adapted for relative angular arrangement. On the end of each shaft is provided a coupling 13 having three spider arms 14. Between these couplings I provide three disks 15 in which my present invention is more particularly embodied. The arms 14 of the two couplings are arranged in staggered relation and bolts 16 are disposed through their ends and through suitable openings 17 in the disks 15, spacing members or washers 18 being provided. Except for the construction of the disks this arrangement is known in the art and particular description will therefore be unnecessary.

Figure 4:
Fig. 4 is a section taken substantially on the line 4—4 of Fig. 3.

Each disk or annulus 15 consists of a number of plies of knitted or crocheted material, as indicated at 19 in Figs. 3 and 4. These plies are incorporated in or embedded in suitable vulcanizable material, as rubber, the whole forming in the complete structure a solid unitary member.

The turning of the shafts when angularly arranged causes a flexure back and forth perpendicularly to the disks as will be readily understood, and since the embedded plies of reinforcing material are knitted or crocheted or otherwise formed of a single continuous thread or yarn, it will be manifest that the sudden stretching of the material will merely produce a straightening out of the continuous curvature given this thread, string or yarn, as can be readily appreciated upon viewing Fig. 3.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A flexible ring for joints of the universal type, comprising a plurality of plies of knitted strands passing around and interlocking one with another and embedded within a vulcanized perforated body, whereby the loops of said strands are adapted to resist and compensate for strains applied to the perforations in said body.

FRANK H. STANWOOD.